US012583407B2

(12) United States Patent
Ohno et al.

(10) Patent No.: US 12,583,407 B2
(45) Date of Patent: Mar. 24, 2026

(54) VEHICLE PASSENGER PROTECTING DEVICE HAVING A SIDE AIRBAG AND A CURTAIN AIRBAG WITH AN ENLARGED INFLATING PORTION

(71) Applicant: TOYOTA JIDOSHA KABUSHIKI KAISHA, Toyota (JP)

(72) Inventors: Mitsuyoshi Ohno, Miyoshi (JP); Akira Kaneko, Toyota (JP); Tatsuya Hashido, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/043,568

(22) Filed: Feb. 3, 2025

(65) Prior Publication Data

US 2025/0263038 A1 Aug. 21, 2025

(30) Foreign Application Priority Data

Feb. 20, 2024 (JP) ................................. 2024-023656

(51) Int. Cl.
B60R 21/015 (2006.01)
B60R 21/207 (2006.01)
(Continued)

(52) U.S. Cl.
CPC ...... B60R 21/01554 (2014.10); B60R 21/207 (2013.01); B60R 21/213 (2013.01); B60R 21/232 (2013.01)

(58) Field of Classification Search
CPC ............ B60R 21/01554; B60R 21/207; B60R 21/213; B60R 21/232; B60R 2021/23107
See application file for complete search history.

(56) References Cited

U.S. PATENT DOCUMENTS 6,802,530 B2 * 10/2004 Wipasuramonton ........................ B60R 21/23138
280/730.2
7,775,553 B2 * 8/2010 Takemura ............. B60R 21/232
280/730.2
(Continued)

FOREIGN PATENT DOCUMENTS

EP 4212396 A1 7/2023
JP 2008-290529 A 12/2008
(Continued)

OTHER PUBLICATIONS

Machine translation of WO2022055081A1, WO, Gwon et al., published Mar. 17, 2022, translation obtained Oct. 8, 2025. (Year: 2025).*

*Primary Examiner* — Laura Freedman
(74) *Attorney, Agent, or Firm* — Dinsmore & Shohl LLP

(57) ABSTRACT

A vehicle passenger protecting device includes: a side airbag installed in a side portion at an outer side of a seatback of a vehicle seat, and inflating and expanding toward an outer side of a passenger seated on the vehicle seat due to gas being supplied at a time of a side collision of a vehicle; and a curtain airbag installed in at least a roof side rail, and inflating and expanding toward a vehicle lower side due to gas being supplied at a time of a side collision of the vehicle. The curtain airbag has an enlarged inflating portion that overlaps a center of a head of the passenger as seen in a side view, when the vehicle seat has been slid to a predetermined position at a vehicle rear side and the seatback has been set in a relaxed posture of being reclined to a recommended limit position.

9 Claims, 4 Drawing Sheets

(51) Int. Cl.
    *B60R 21/213*         (2011.01)
    *B60R 21/232*         (2011.01)

(56)              References Cited

U.S. PATENT DOCUMENTS

| | | | |
|---|---|---|---|
| 7,988,187 B2 * | 8/2011 | Yamamura | B60R 21/232 |
| | | | 280/730.2 |
| 10,696,265 B2 * | 6/2020 | Shin | B60R 21/2338 |
| 11,059,442 B2 * | 7/2021 | Adler | B60R 21/23138 |
| 11,084,450 B2 * | 8/2021 | Ohno | B60R 21/213 |
| 11,130,429 B2 * | 9/2021 | Ohno | B60N 2/42745 |
| 11,919,471 B2 * | 3/2024 | Wahl | B60R 21/239 |
| 12,043,199 B2 * | 7/2024 | Santín Navarro | |
| | | | B60R 21/23138 |
| 12,337,788 B2 * | 6/2025 | Kim | B60R 21/23138 |
| 2008/0296876 A1 | 12/2008 | Ideue | |
| 2019/0225184 A1 | 7/2019 | Ohno | |
| 2020/0108792 A1 | 4/2020 | Ohno et al. | |
| 2023/0191955 A1 | 6/2023 | Suzuki et al. | |
| 2024/0262340 A1 | 8/2024 | Numajiri et al. | |
| 2025/0263039 A1 * | 8/2025 | Ohno | B60R 21/01554 |

FOREIGN PATENT DOCUMENTS

| | | | | |
|---|---|---|---|---|
| JP | 2019-127101 A | 8/2019 | | |
| JP | 2020-055465 A | 4/2020 | | |
| JP | 2023-035747 A | 3/2023 | | |
| JP | 2023-092996 A | 7/2023 | | |
| WO | WO-2022055081 A1 * | 3/2022 | | B60R 21/232 |
| WO | WO-2022055082 A1 * | 3/2022 | | B60R 21/264 |

* cited by examiner

VEHICLE PASSENGER PROTECTING DEVICE HAVING A SIDE AIRBAG AND A CURTAIN AIRBAG WITH AN ENLARGED INFLATING PORTION

CROSS-REFERENCE TO RELATED APPLICATION

This application is based on and claims priority under 35 USC 119 from Japanese Patent Application No. 2024-023656 filed on Feb. 20, 2024, the disclosure of which is incorporated by reference herein.

BACKGROUND

Technical Field

The present disclosure relates to a vehicle passenger protecting device.

Related Art

There is conventionally known a curtain airbag device for a vehicle having a distal end chamber that receives a supply of gas from a main chamber and inflates and expands at the vehicle front side, further toward the vehicle lower side than the door beltline (refer to Japanese Patent Application Laid-Open (JP-A) No. 2020-055465 for example).

This curtain airbag device for a vehicle has, at the lower end portion region of a curtain airbag that is contacted by the head of a passenger when the vehicle seat has been set in a relaxed state, a restraining performance improving portion (high frictional force imparting portion) that increases the reaction force at the time of restraining the head. The head of the passenger slipping-out toward the vehicle transverse direction outer side (the window side) is thereby suppressed.

However, at times of traveling such as during automatic driving of the vehicle, if the vehicle seat is slid to near the rearmost position thereof and the seatback is set in a relaxed posture of being reclined to the recommended limit position, the head of the passenger is very low toward the vehicle lower side, and therefore, there is the possibility that the head of the passenger may be out of the range of the inflating portion of the curtain airbag. Namely, there is the possibility that the head of the passenger will not be able to be protected by the curtain airbag at the time of a side collision of the vehicle.

As a countermeasure thereto, it has been thought to enlarge the inflating portion of the curtain airbag toward the vehicle lower side and broaden the head protecting region thereof. However, if the inflating portion of the curtain airbag is enlarged toward the vehicle lower side over the entire range of positions of the head of the passenger that are possible due to sliding of the vehicle seat, the curtain airbag may interfere with (hit) the side airbag that is attached to the seatback and that inflates and expands at the time of a side collision of the vehicle, and the curtain airbag may not expand normally all the way to the vehicle lower side, and the head of the passenger may be out of the range of the inflating portion of the curtain airbag.

Thus, an object of the present disclosure is to provide a vehicle passenger protecting device that, even in a case in which a vehicle seat has been slid to a predetermined position at the vehicle rear side and the seatback has been set in a relaxed posture of being reclined to the recommended limit position, can suppress the head of the passenger being out of the range of the inflating portion of the curtain airbag at the time of a side collision of the vehicle.

SUMMARY

In order to achieve the above-described object, a vehicle passenger protecting device of a first aspect relating to the present disclosure includes: a side airbag that is installed in a side portion at a vehicle transverse direction outer side of a seatback of a vehicle seat, and that inflate and expands toward a vehicle transverse direction outer side of a passenger seated on a seat cushion of the vehicle seat due to gas being supplied thereto at a time of a side collision of a vehicle; and a curtain airbag that is installed in at least a roof side rail of the vehicle, and that inflates and expands toward a vehicle lower side due to gas being supplied thereto at a time of a side collision of the vehicle, wherein the curtain airbag has an enlarged inflating portion that overlaps with a center of a head of the passenger as seen in a side view, in a case in which the vehicle seat has been slid to a predetermined position at a vehicle rear side and the seatback has been set in a relaxed posture of being reclined to a recommended limit position.

In accordance with the vehicle passenger protecting device of the first aspect, the curtain airbag has an enlarged inflating portion that overlaps the center of the head of the passenger as seen in a side view, at the time when the vehicle seat has been slid to a predetermined position at the vehicle rear side and the seatback of the vehicle seat has been set in a relaxed posture of being reclined to a recommended limit position. Here, because the relaxed posture is specified as described above, the position of the center of the head of the passenger is limited. Accordingly, at the time of a side collision of the vehicle, the head of the passenger being out of the range of the inflating portion (the enlarged inflating portion) of the curtain airbag is suppressed. Note that what is called the "time of a collision" here also includes times when the inevitability of a collision is predicted (foreseen).

In a vehicle passenger protecting device of a second aspect relating to the present disclosure, in the vehicle passenger protecting device of the first aspect, the predetermined position is a rearmost position or a position up to 50 mm toward a vehicle front side from the rearmost position.

In accordance with the vehicle passenger protecting device of the second aspect, the predetermined position, at the vehicle rear side, of the vehicle seat is the rearmost position or a position that is up to 50 mm toward the vehicle front side from the rearmost position. Accordingly, the position of the center of the head of the passenger can be limited more minutely, and the position of the enlarged inflating portion that is formed at the curtain airbag can be specified more minutely. Therefore, an unnecessary increase in the volume of the curtain airbag is suppressed.

In a vehicle passenger protecting device of a third aspect relating to the present disclosure, in the vehicle passenger protecting device of the first or second aspect, the enlarged inflating portion that has been inflated and expanded is disposed at a position that, as seen in a side view, does not overlap with an inflation/expansion region of the side airbag at a time at which the vehicle seat has been slid to the predetermined position at the vehicle rear side.

In accordance with the vehicle passenger protecting device of the third aspect, the enlarged inflating portion that has been inflated and expanded is disposed at a position that, as seen in a side view, does not overlap the inflation/expansion region of the side airbag at the time when the vehicle seat has been slid to the predetermined position at the vehicle rear side. Accordingly, at the time of inflation and expansion of the curtain airbag, the enlarged inflating portion is prevented from interfering with the side airbag and inflates and expands normally. Note that what is called "does not overlap as seen in a side view" in the present disclosure means that the inflating portion at the enlarged inflating portion does not overlap the inflating portion of the side airbag. Accordingly, a case in which only outer peripheral edge portions (non-inflating portions), into which gas is not filled, of the enlarged inflating portion overlap the side airbag as seen in a side view is included in the present disclosure.

In a vehicle passenger protecting device of a fourth aspect relating to the present disclosure, in the vehicle passenger protecting device of any one of the first through third aspects, as seen in a side view, a lower end of the enlarged inflating portion that has been inflated and expanded is positioned further toward the vehicle lower side than a center of a head of a passenger corresponding to an AF05 human dummy.

In accordance with the vehicle passenger protecting device of the fourth aspect, the lower end of the enlarged inflating portion that has been inflated and expanded is, as seen in a side view, positioned further toward the vehicle lower side than the center of the head of a passenger that corresponds to an AF05 human dummy. Accordingly, even if the seated passenger is a passenger of a small frame corresponding to an AF05 human dummy, the head of the passenger being out of the range of the inflating portion (the enlarged inflating portion) of the curtain airbag at the time of a side collision of the vehicle is suppressed.

In a vehicle passenger protecting device of a fifth aspect relating to the present disclosure, in the vehicle passenger protecting device of any one of the first through fourth aspects, the enlarged inflating portion that has been inflated and expanded contacts a door trim that is further toward the vehicle lower side than a door beltline.

In accordance with the vehicle passenger protecting device of the fifth aspect, the enlarged inflating portion that has been inflated and expanded contacts the door trim that is further toward the vehicle lower side than the door beltline. Accordingly, the ability to prevent the passenger from being thrown out of the vehicle at the time of a rollover of the vehicle is improved by the enlarged inflating portion.

In a vehicle passenger protecting device of a sixth aspect relating to the present disclosure, in the vehicle passenger protecting device of any one of the first through fifth aspects, the seatback is structured such that, at a time at which the vehicle is traveling, reclining to the relaxed posture is prohibited if the vehicle seat has not been slid to the predetermined position at the vehicle rear side.

In accordance with the vehicle passenger protecting device of the sixth aspect, if the vehicle seat has not been slid to the predetermined position at the vehicle rear side at the time when the vehicle is traveling, reclining of the seatback to the relaxed posture is prohibited. Accordingly, at the time of a side collision of the vehicle, the head of the passenger being out of the range of the inflating portion (the enlarged inflating portion) of the curtain airbag is suppressed.

In a vehicle passenger protecting device of a seventh aspect relating to the present disclosure, in the vehicle passenger protecting device of any one of the first through fifth aspects, at a time at which the vehicle is traveling, a warning is given if the seatback is reclined to the relaxed posture in a state in which the vehicle seat has not been slid to the predetermined position at the vehicle rear side.

In accordance with the vehicle passenger protecting device of the seventh aspect, a warning is given if the seatback is reclined to the relaxed posture in a state in which the vehicle seat has not been slid to the predetermined position at the vehicle rear side at a time when the vehicle is traveling. Accordingly, the passenger can be urged to slide the vehicle seat all the way to the predetermined position at the vehicle rear side, and the head of the passenger being out of the range of the inflating portion (the enlarged inflating portion) of the curtain airbag at the time of a side collision of the vehicle is suppressed.

In a vehicle passenger protecting device of an eighth aspect relating to the present disclosure, in the vehicle passenger protecting device of any one of the first through seventh aspects, the seatback is configured to, at a time at which the vehicle is traveling, be stood up automatically if the vehicle seat is slid toward a vehicle front side in a state in which the seatback has been set in the relaxed posture.

In accordance with the vehicle passenger protecting device of the eighth aspect, at a time when the vehicle is traveling, the seatback is stood up automatically if the vehicle seat is slid toward the vehicle front side in a state in which the seatback has been set in the relaxed posture. Accordingly, the head of the passenger being out of the range of the inflating portion (the enlarged inflating portion) of the curtain airbag at the time of a side collision of the vehicle is suppressed.

As described above, in accordance with the present disclosure, the head of the passenger being out of the range of the inflating portion of the curtain airbag at the time of a side collision of the vehicle can be suppressed even in a case in which the vehicle seat has been slid to a predetermined position at the vehicle rear side and the seatback has been set in a relaxed posture of being reclined to the recommended limit position.

BRIEF DESCRIPTION OF THE DRAWINGS

An exemplary embodiment of the present disclosure will be described in detail based on the following figures, wherein.

DETAILED DESCRIPTION

An embodiment relating to the present disclosure is described in detail hereinafter on the basis of the drawings. Note that, for convenience, arrow UP that is shown appropriately in the respective drawings indicates the vehicle upward direction, and arrow FR indicates the vehicle frontward direction. Accordingly, in the following explanation, when vertical and longitudinal directions are used without being specified otherwise, they refer to the vertical and the longitudinal of the vehicle. Further, the left-right direction is the same as the vehicle transverse direction.

Further, in a vehicle passenger protecting device 10 relating to the present embodiment, an automobile 12 at which automatic driving is possible is used as an example of the vehicle, and a case in which passenger P is seated in vehicle seat 14 at the right side that is a front seat (the driver's seat) of the automobile 12 is used as an example. Note that the passenger P is a human dummy for a crash test, and this human dummy is, for example, an AF05 (5th percentile U.S. adult female) internationally standardized side crash dummy (World Side Impact Dummy: World SID).

Figure 1:
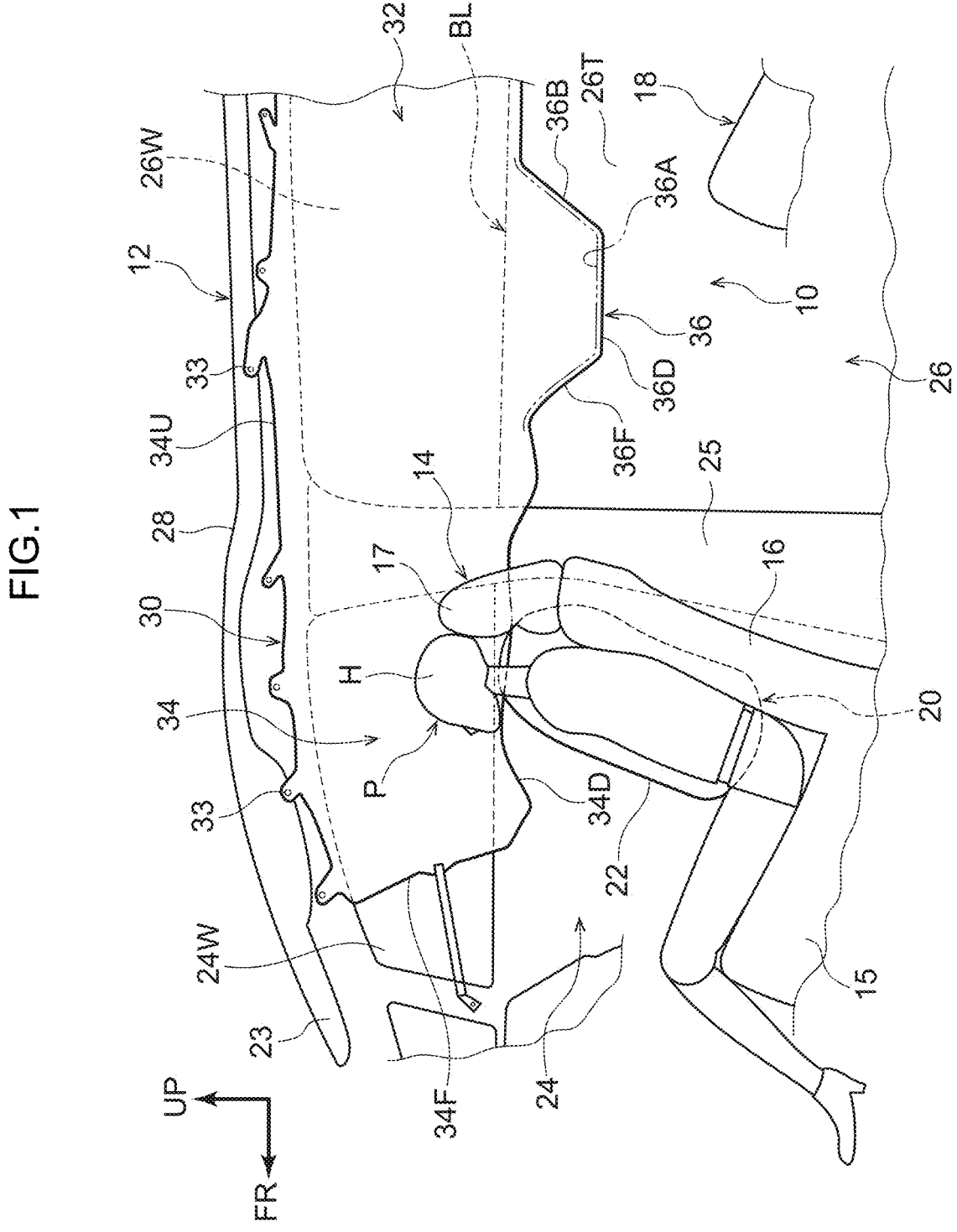
FIG. 1 is a schematic side view illustrating inflated and expanded states of a curtain airbag and a side airbag relating to a present embodiment at the time when a vehicle seat is positioned at a frontmost position.
Figure 2:
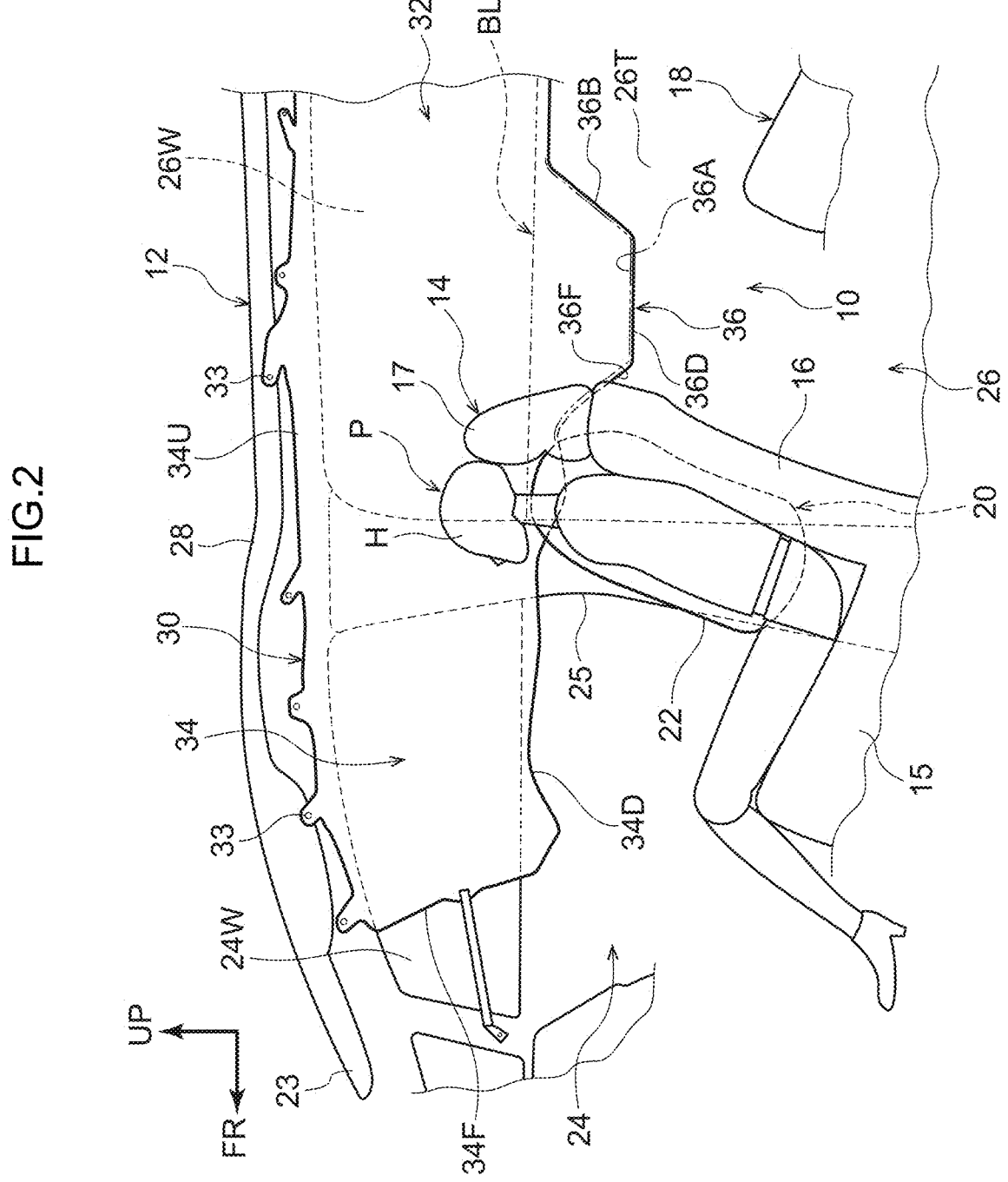
FIG. 2 is a schematic side view illustrating inflated and expanded states of the curtain airbag and the side airbag relating to the present embodiment at a time when the vehicle seat is positioned at a rearmost position.
Figure 3:
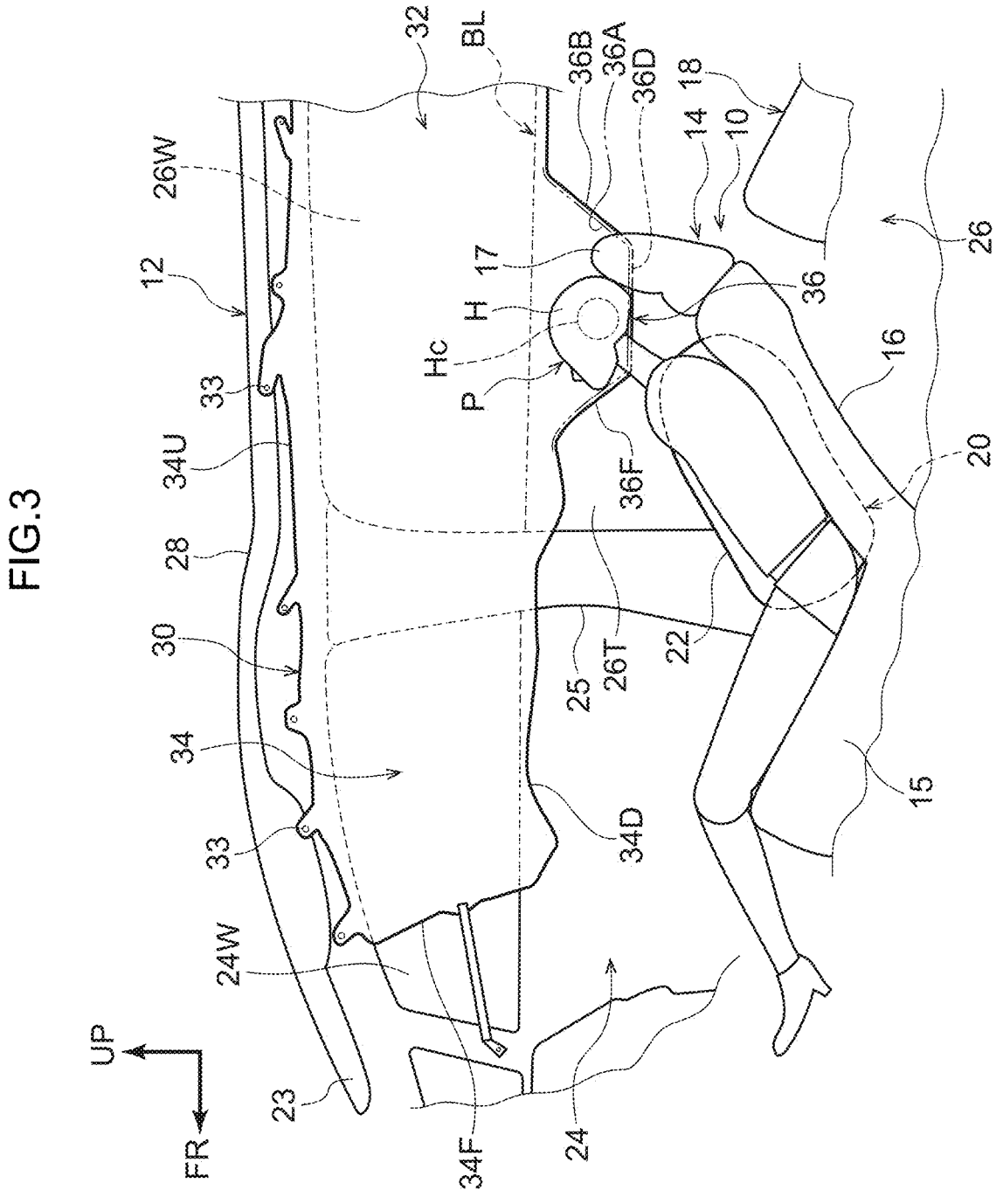
FIG. 3 is a schematic side view illustrating inflated and expanded states of the curtain airbag and the side airbag relating to the present embodiment at a time when the vehicle seat is positioned at the rearmost position and a seatback thereof has been reclined to a limit position.

As illustrated in FIG. 1 through FIG. 3, the vehicle seat 14 has a seat cushion 15 that supports the buttocks and thighs of the passenger P, a seatback 16 that supports the back of the passenger P, and a headrest 17 that supports head H of the passenger P. The passenger P is seated in the vehicle seat 14 in a manner of seating prescribed by a side impact test method, and is restrained in the vehicle seat 14 by the seatbelt of an unillustrated 3-point seatbelt device.

Further, the seat cushion 15 of the vehicle seat 14 is structured so as to be able to slide in the longitudinal direction by electric power, and the seatback 16 of the vehicle seat 14 is structured so as to be able to tilt in the longitudinal direction by electric power. Note that, hereinafter, the state in which the seatback 16 has been reclined to the recommended limit position is called the "relaxed posture". Further, what is called the "recommended limit position" here means a position that is stood-up slightly more than the limit position to which the seatback 16 can actually be reclined.

A side airbag device 20 is installed in the side portion at the vehicle transverse direction outer side of the seatback 16 of the vehicle seat 14. This side airbag device 20 is structured to include an inflator (not illustrated) embedded in a side portion of the seatback 16, and a side airbag 22 that inflates and expands due to gas that is jetted-out from the inflator being supplied to the interior of the side airbag 22.

The inflator is a cylinder-type gas generating device that is formed substantially in the shape of a cylindrical tube for example, and is embedded such that the axial direction thereof is a direction running substantially along the vertical direction that is the extending direction of side frames (not illustrated) that structure the frame at the left and right both side portions of the seatback 16. The inflator operates when a side collision of the automobile 12 is sensed or predicted (hereinafter called "at the time of a side collision" upon occasion), and gas can be supplied instantaneously into the interior of the side airbag 22.

The side airbag 22 is formed in the shape of a simple bag due to the outer peripheral edge portions of two base fabrics being sewn together. The side airbag 22 is structured so as to, due to gas that is jetted-out from the inflator being supplied into the interior thereof, inflate and expand toward the vehicle transverse direction outer side of the passenger P seated in the vehicle seat 14. Note that, in a side view seen from the vehicle transverse direction, the side airbag 22 is formed to a size of an extent such that the side airbag 22 can cover at least the region from the waist region to the shoulder portion of the passenger P.

Further, curtain airbag devices 30 are installed respectively in at least roof side rails 28 at the left and the right of the automobile 12, and in detail, from the rear end portions of left and right front pillars 23 through the roof side rails 28 to the front end portions of rear pillars (not illustrated). Note that, because the curtain airbag devices 30 have the same structures but are symmetrical at the left and the right, only the curtain airbag device 30 at the right side is described hereinafter.

This curtain airbag device 30 is structured to include an inflator (not illustrated) embedded in, for example, the substantially central portion in the longitudinal direction of the roof side rail 28, and a curtain airbag 32 that inflates and expands due to gas that is jetted-out from the inflator being supplied to the interior of the curtain airbag 32.

This inflator also is a cylinder-type gas generating device that is formed substantially in the shape of a cylindrical tube for example, and is embedded such that the axial direction thereof is a direction running substantially along the longitudinal direction that is the extending direction of the roof side rail 28. The inflator operates at the time of a side collision of the automobile 12, and gas can be supplied instantaneously into the interior of the curtain airbag 32.

The curtain airbag 32 is structured integrally by double weaving by, for example, the one piece woven (abbreviated as OPW) method. In the OPW method, while two base fabrics are simultaneously woven by using a Jacquard machine, necessary places of the two base fabrics are multi-ply woven, and a bag body that is not sewn is thereby formed.

Note that the method of manufacturing the curtain airbag 32 is not limited to the above-described OPW method. For example, the curtain airbag 32 may be manufactured by sewing, in the form of a bag, one or plural base fabrics that are formed by cutting out polyamide or polyester fabric materials.

Further, at the time of a side collision or at the time of a rollover of the automobile 12, the curtain airbag 32 inflates and expands toward the lower side due to gas that is jetted-out from the inflator being supplied to the interior of the curtain airbag 32. The curtain airbag 32 is formed to be a size of an extent that, as seen in a side view, can cover at least the head H of the passenger P seated in the vehicle seat 14 that is a front seat and at least the head of a passenger (not illustrated) seated in a vehicle seat 18 that is a rear seat (in FIG. 1 through FIG. 3, only the front end portion of the seat cushion of the vehicle seat 18 is illustrated).

Namely, the curtain airbag 32 is structured so as to inflate and expand in the form of a curtain along a front side glass 24W of a front side door 24, and substantially the upper half of a center pillar 25 that extends in the vertical direction, and a rear side glass 26W of a rear side door 26. Accordingly, the longitudinal direction is the length direction of the curtain airbag 32. Note that the specific structure of the curtain airbag 32 is described in detail later.

The inflator of the side airbag device 20 and the inflator of the curtain airbag device 30 respectively are electrically connected to an airbag ECU (Electronic Control Unit, not illustrated) provided at the automobile 12. Side collision sensors and rollover sensors (both including cameras and the like, and none of which are illustrated) that are provided at the automobile 12 respectively are electrically connected to the airbag ECU.

The side collision sensors are structured so as sense or predict a side collision of the automobile 12 and output a side collision signal to the airbag ECU. The rollover sensors are structured so as to sense or predict a rollover of the automobile 12 and output a rollover signal to the airbag ECU.

When a side collision signal is inputted thereto, the airbag ECU operates the inflator of the side airbag device 20 and the inflator of the curtain airbag device 30 that are at the side of the side collision (the near side). Due thereto, the side airbag 22 and the curtain airbag 32 at the near side receive supplies of gas and inflate and expand. Note that, when a rollover signal is inputted thereto, the airbag ECU operates the inflators of the left and right curtain airbag devices 30.

Further, when a rollover signal is inputted after a side collision, the airbag ECU operates the inflator of the curtain airbag device 30 that is at the side (the far side) opposite the near side at which the airbag devices are already operating. A control device (not illustrated) that controls respective sections is installed in the automobile 12 separately from the airbag ECU.

The curtain airbag 32 is structured to include a curtain airbag main body 34 that extends in the longitudinal direction, and an enlarged inflating portion 36 formed integrally and continuously with the lower end of the rear portion of the curtain airbag main body 34. The curtain airbag main body 34 is a known structure. Inflating portions (not illustrated) in which gas is filled and non-inflating portions (not illustrated) for partitioning gas supply paths are formed at predetermined, plural regions of the curtain airbag main body 34.

At least the head of the passenger P seated in the vehicle seat 14 that is a front seat and at least the head of the passenger seated in the vehicle seat 18 that is a rear seat are restrained and protected by inflating portions formed at the curtain airbag main body 34. Note that gas is not filled into the outer peripheral edge portions of the curtain airbag 32, i.e., an upper edge portion 34U, a lower edge portion 34D, a front edge portion 34F and a rear edge portion (not illustrated) of the curtain airbag main body 34, and a front edge portion 36F, a lower edge portion 36D and a rear edge portion 36B of the enlarged inflating portion 36, and these portions are non-inflating portions.

Plural fixing tabs 33 extend out toward the upper side at the upper edge portion 34U of the curtain airbag main body 34. The respective fixing tabs 33 are structures formed by a base fabric, which is similar to the base fabric of the curtain airbag main body 34, being cut-out in substantially rectangular forms, and are joined to the upper edge portion 34U of the curtain airbag main body 34 by being sewn thereto. Note that the respective fixing tabs 33 may be structures that extend out integrally from the upper edge portion 34U of the curtain airbag main body 34.

The respective fixing tabs 33 are positioned at the roof side rail 28 including at the rear end portion of the front pillar 23 and the front end portion of the rear pillar. Namely, the respective fixing tabs 33 are fixed to the roof side rail 28 that reaches from the rear end portion of the front pillar 23 to the front end portion of the rear pillar, by fasteners (not illustrated) such as clips or nuts and bolts for example. Note that, at usual times, the curtain airbag 32 is accommodated in the roof side rail 28 together with the inflator in a state of being formed in an elongated shape by being rolled-up in the form of a roll whose axial direction is substantially the longitudinal direction.

When the vehicle seat 14 has been slid to a predetermined position at the rear side and the seatback 16 is set in the relaxed posture of being reclined to the recommended limit position, the enlarged inflating portion 36 of the curtain airbag 32 is disposed at a position overlapping center Hc of the head of the passenger P as seen in a side view. Note that what is called the "predetermined position" here is the rearmost position of the vehicle seat 14 or a position that is up to 50 mm forward from the rearmost position. Further, the "center Hc of the head" is the central portion of the head H of the passenger as seen in a side view, and is the portion indicated by the circular dashed line in FIG. 3.

Further, as seen in a side view, the enlarged inflating portion 36 that has been inflated and expanded is formed in a substantially trapezoidal shape that extends further toward the lower side than door beltline BL, and contacts a door trim 26T of the rear side door 26 (see FIG. 1). Due thereto, sliding resistance (frictional force) of the enlarged inflating portion 36 with respect to the door trim 26T is obtained, and movement of the enlarged inflating portion 36 toward the vehicle transverse direction outer side is suppressed or prevented.

Further, as illustrated in FIG. 3, the lower end (the lower edge portion 36D) of an inflating portion 36A, into which gas has been filled, of the enlarged inflating portion 36 that has been inflated and expanded is positioned further toward the lower side than the center Hc of the head of the passenger P as seen in a side view. Specifically, the lower end of the inflating portion 36A at the enlarged inflating portion 36 is positioned, for example, 40 mm or more toward the lower side from the center Hc of the head of the passenger P as seen in a side view. Accordingly, at the head H of the passenger P, reaction force is reliably obtained from the enlarged inflating portion 36, and the head H of the passenger P is suitably restrained and protected by the enlarged inflating portion 36.

Figure 4:
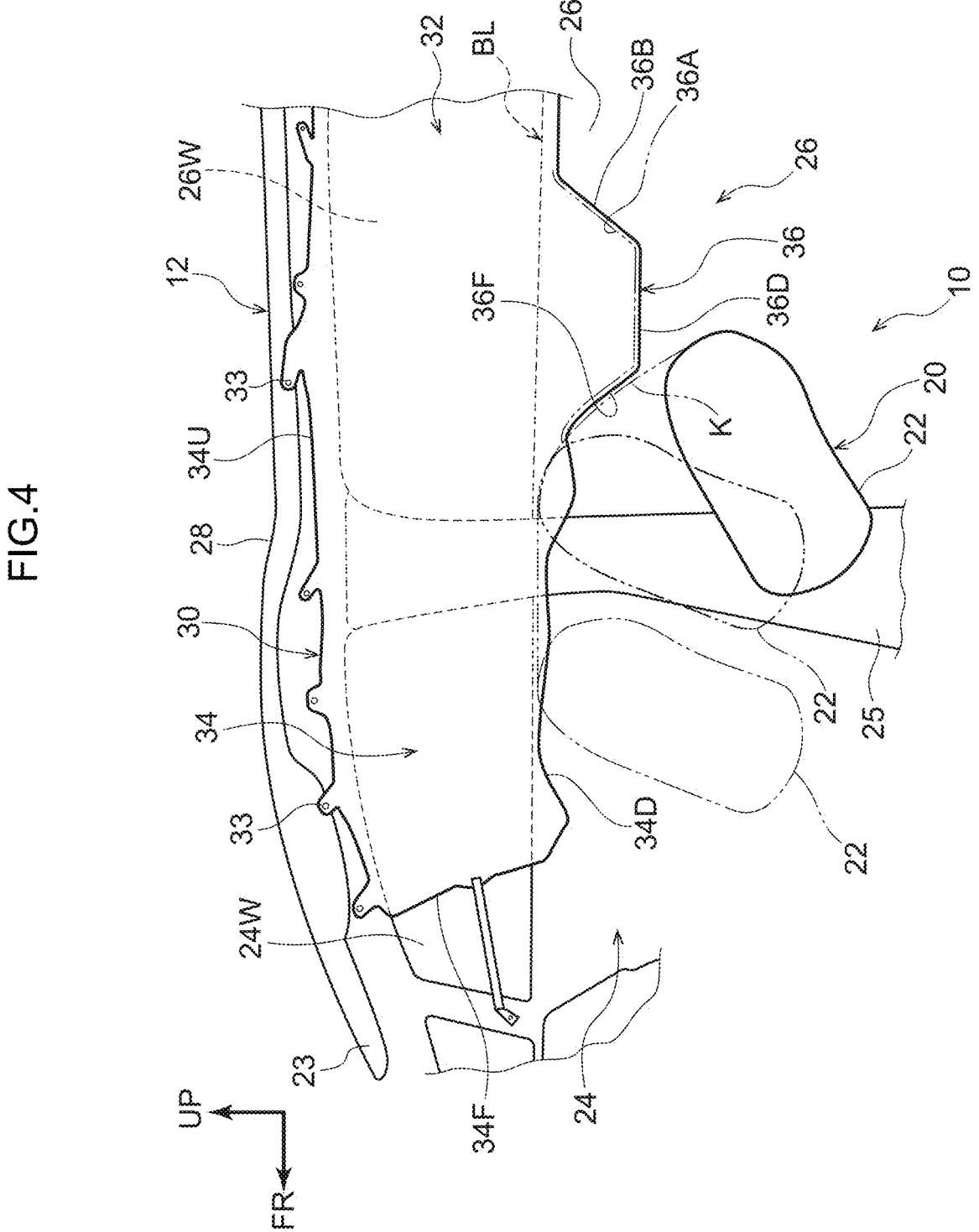
FIG. 4 is a schematic side view illustrating the positional relationship between an enlarged inflating portion of the curtain airbag and the side airbag relating to the present embodiment.

Further, as illustrated in FIG. 4, the enlarged inflating portion 36 that has been inflated and expanded is disposed at a position that, as seen in a side view, does not overlap the inflated/expanded region of the side airbag 22 at the time when the vehicle seat 14 has been slid to the aforementioned predetermined position at the rear side.

More specifically, as illustrated by the imaginary line in FIG. 4, the side airbag 22 that has been inflated and expanded moves parallel within the region in which the vehicle seat 14 moves from the frontmost position to the rearmost position. Further, at this rearmost position, when the seatback 16 is reclined to the relaxed posture, the side airbag 22 that is inflated and expanded moves toward the lower side with the lower end portion side thereof being the supporting point of the rotation, as illustrated by the solid line in FIG. 4.

In this way, the region of movement of the side airbag 22, which is inflated and expanded at the time when the vehicle seat 14 has been slid to the rearmost position and thereafter the seatback 16 has been reclined to the relaxed posture, is the aforementioned inflation/expansion region of the side airbag 22. However, the front edge portion 36F of the enlarged inflating portion 36 is positioned further toward the rear side than substantially arc-shaped locus of movement K of the upper end of the side airbag 22.

Note that what is called "does not overlap as seen in a side view" here means that the inflating portion 36A of the enlarged inflating portion 36 does not overlap the inflating portion of the side airbag 22. Accordingly, at the enlarged inflating portion 36, a case in which only the front edge portion 36F or the lower edge portion 36D, which are non-inflating portions into which gas is not filled, overlap the side airbag 22 as seen in a side view is included in the "does not overlap as seen in a side view".

Namely, the front edge portion 36F of the enlarged inflating portion 36 illustrated in FIG. 4 does not overlap the substantially arc-shaped locus of movement K of the upper end of the side airbag 22. However, if only this front edge portion 36F (e.g., less than or equal to 30 mm if the width of the front edge portion 36F is 30 mm) overlaps the locus of movement K, there is no concern that that the front edge portion 36F will impede the inflation and expansion of the side airbag 22, and therefore, there may be a structure in which the front edge portion 36F does overlap the locus of movement K.

Further, there is a structure in which reclining of the seatback 16 to the relaxed posture is prohibited if the vehicle seat 14 has not been slid to the aforementioned predetermined position at the rear side at the time when the automobile 12 travels. Namely, a position sensor (not illustrated) senses that the vehicle seat 14 has not been slid all the way to the aforementioned predetermined position at the rear side, and control is carried out by a control device such that, at times of this state, even if a switch for reclining the seatback 16 is turned on, the motor (not illustrated) that tilts the seatback 16 is not energized.

Note that there may be a structure in which, in a state in which the vehicle seat 14 has not been slid to the aforementioned predetermined position at the rear side when the automobile 12 is traveling, a warning is given if the seatback 16 is reclined to the relaxed posture. Namely, there may be a structure in which the position sensor senses that the vehicle seat 14 has not been slid to the aforementioned predetermined position at the rear side, and control is carried out by a control device such that, at times of this state, if the switch for reclining the seatback 16 is turned on, for example, a warning noise or a warning by voice is issued from a speaker (not illustrated) provided in the vehicle cabin, or a warning is displayed on a display (not illustrated) provided in the vehicle cabin.

Further, the vehicle passenger protecting device 10 relating to the present embodiment is structured such that, in a state in which the seatback 16 has been set in the relaxed posture at the time when the automobile 12 is traveling by automatic driving, if the vehicle seat 14 is slid forward, it is considered that the center Hc of the head of the passenger P is out of the range of the inflation/expansion region of the enlarged inflating portion 36 as seen in a side view, and the seatback 16 is stood up automatically.

Namely, there is a structure in which an angle sensor (not illustrated) senses that the seatback 16 has been set in the relaxed posture, and, at times of this state, control is carried out by a control device such that, when the position sensor senses that the vehicle seat 14 has been slid forward, the motor that tilts the seatback 16 is automatically energized, and the seatback 16 is stood up automatically.

Operation of the vehicle passenger protecting device 10 relating to the present embodiment that is structured as described above is described next.

When the collision sensor senses that the automobile 12 has been collided with from the side, a side collision signal is transmitted from the side collision sensor to the airbag ECU. When the side collision signal is inputted to the airbag ECU, the airbag ECU operates the inflator of the side airbag device 20 and the inflator of the curtain airbag device 30 that are at the side of the side collision (the right side in the illustrated structure), and gas is instantaneously jetted-out into the side airbag 22 and into the curtain airbag 32. Namely, the airbag ECU inflates and expands the side airbag 22 and the curtain airbag 32.

Due thereto, both in a case in which the vehicle seat 14 is positioned at the frontmost position as illustrated in FIG. 1 for example, and in a case in which the vehicle seat 14 is positioned at the rearmost position as illustrated in FIG. 2 for example, as seen in a side view, at least the region from the waist region to the shoulder portion of the passenger P is restrained and protected by the side airbag 22, and at least the head H of the passenger P is restrained and protected by the curtain airbag main body 34 of the curtain airbag 32.

By the way, when the automobile 12 is traveling by automatic driving, there are cases in which, as illustrated in FIG. 3 for example, the vehicle seat 14 is positioned at the rearmost position and the seatback 16 is set in the relaxed posture in which it is reclined to the recommended limit position. At times of this state, when the side collision sensor senses that the automobile 12 has been collided with from the side, in the same way as described above, the airbag ECU inflates and expands the side airbag 22 and the curtain airbag 32, and the enlarged inflating portion 36 is provided at the curtain airbag 32.

Here, because it has been specified that the seatback 16 of the vehicle seat 14 has been reclined to the relaxed posture as described above, the position of the headrest 17 is limited to a specific position at the lower side. Namely, the position of the center Hc of the head of the passenger P, and by extension, the position of the entire head H of the passenger P, is limited to a position of overlapping the enlarged inflating portion 36 of the curtain airbag 32 as seen in a side view.

Accordingly, at the time of a side collision of the automobile 12, the head H of the passenger P being outside of the range of the enlarged inflating portion 36 that is one inflating portion of the curtain airbag 32 can be suppressed or prevented. Namely, a deterioration in the performance of restraining the head H of the passenger P by the curtain airbag 32 can be suppressed or prevented, and the head H of the passenger P can be restrained and protected by the enlarged inflating portion 36.

Moreover, if the predetermined position, at the rear side, of the vehicle seat 14 is the rearmost position or a position that is up to 50 mm toward the front side of the vehicle from the rearmost position, the position of the center Hc of the head of the passenger P, and by extension, the position of the entire head H of the passenger P, can be limited more minutely, and the position of the enlarged inflating portion 36 that is formed integrally with the curtain airbag 32 can be specified more minutely. Therefore, an unnecessary increase in the volume of the curtain airbag 32, and an accompanying increase in the output of the inflator, can be suppressed.

Further, the enlarged inflating portion 36, which has been inflated and expanded, of the curtain airbag 32 is disposed at a position that, as seen in a side view, does not overlap the inflation/expansion region of the side airbag 22 at the time when the vehicle seat 14 has been slid to the aforementioned predetermined position at the rear side. Accordingly, at the time of inflation and expansion of the curtain airbag 32, this enlarged inflating portion 36 interfering with (hitting) the side airbag 22 can be prevented, and the enlarged inflating portion 36 can inflate and expand normally all the way to the lower side.

Further, as seen in a side view, the lower end of the enlarged inflating portion 36, which has been inflated and expanded, of the curtain airbag 32 is positioned further toward the lower side than the center Hc of the head of the passenger P that corresponds to an AF05 human dummy. Accordingly, even if the passenger P seated on the seat cushion 15 of the vehicle seat 14 is a passenger of a small frame corresponding to an AF05 human dummy, the head H of the passenger P being out of the range of the enlarged inflating portion 36 of the curtain airbag 32 at the time of a side collision of the automobile 12 can be suppressed or prevented.

Further, the enlarged inflating portion 36, which has been inflated and expanded, of the curtain airbag 32 contacts the door trim 26T that is at the lower side of the door beltline BL. Accordingly, the enlarged inflating portion 36 moving toward the vehicle transverse direction outer side can be suppressed or prevented, and a deterioration in the performance of restraining the head H of the passenger P by the enlarged inflating portion 36 can be suppressed or prevented, and the ability to prevent the passenger P from being thrown out of the vehicle at the time of a rollover of the automobile 12 can be improved.

Further, in the vehicle passenger protecting device 10 relating to the present embodiment, if the vehicle seat 14 has not been slid to the aforementioned predetermined position at the rear side when the automobile 12 is traveling, reclining of the seatback 16 to the relaxed posture is prohibited. In accordance therewith, the head H of the passenger P being outside of the range of the enlarged inflating portion 36 of the curtain airbag 32 at the time of a side collision of the automobile 12 can be suppressed more reliably.

Note that, if the seatback 16 is reclined to the relaxed posture in a state in which the vehicle seat 14 has not been slid to the aforementioned predetermined position at the rear side when the automobile 12 is traveling, a warning noise or a voice warning may be emitted, or a warning may be displayed on a display. In this case, the passenger P can be urged to slide the vehicle seat 14 all the way to the aforementioned predetermined position at the rear side. Therefore, the head H of the passenger P being out of the range of the enlarged inflating portion 36 of the curtain airbag 32 at the time of a side collision of the automobile 12 can be suppressed.

Further, in the vehicle passenger protecting device 10 relating to the present embodiment, when the automobile 12 is traveling by automatic driving, if the vehicle seat 14 is slid toward the front side in the state in which the seatback 16 has been set in the relaxed posture, it is considered that the center Hc of the head of the passenger P is outside of the range of the inflation/expansion region of the enlarged inflating portion 36 of the curtain airbag 32 as seen in a side view, and the seatback 16 is stood-up automatically. In accordance therewith, the head H of the passenger P being out of the range of the enlarged inflating portion 36 of the curtain airbag 32 at the time of a side collision of the automobile 12 can be suppressed more reliably.

The vehicle passenger protecting device 10 relating to the present embodiment has been described above on the basis of the drawings, but the vehicle passenger protecting device 10 relating to the present embodiment is not limited to the illustrated structure, and the design thereof can be changed appropriately within a scope that does not depart from the gist of the present disclosure. For example, the vehicle passenger protecting device 10 relating to the present embodiment can also be applied to cases of the vehicle seat 14 that is the front passenger's seat. Accordingly, the vehicle relating to the present embodiment is not limited to the automobile 12 that can be driven automatically.

Further, the vehicle seat 14 is not limited to a structure that is slid or tilted by electric power, and may be a structure that is slid or tilted manually. In this case, it suffices to sense the position and the reclining angle of the vehicle seat 14 by sensing device such as a camera provided in the vehicle cabin. Further, in this case, because the seatback 16 does not tilt automatically, the above-described function of giving a warning is incorporated.

What is claimed is:

1. A vehicle passenger protecting device of a vehicle, the vehicle passenger protecting device comprising:

a side airbag that is installed in a side portion at a vehicle transverse direction outer side of a seatback of a vehicle seat, and that inflates and expands toward a vehicle transverse direction outer side of a passenger seated on a seat cushion of the vehicle seat due to gas being supplied thereto at a time of a side collision of the vehicle; and a curtain airbag that is installed in at least a roof side rail of the vehicle, and that inflates and expands toward a vehicle lower side due to gas being supplied thereto at the time of a side collision of the vehicle, wherein the curtain airbag has a curtain airbag main body having a lower edge portion that extends in a vehicle longitudinal direction along a beltline of a door of the vehicle, wherein the curtain airbag has an enlarged inflating portion that is formed integrally and continuously with a portion of the lower edge portion of the curtain airbag main body, the enlarged inflating portion extends downward in a vehicle vertical direction from the portion of the lower edge portion of the curtain airbag main body, the enlarged inflating portion extends further downward toward the vehicle lower side than the beltline of the door of the vehicle and the lower edge portion of the curtain airbag main body, the enlarged inflating portion overlaps with a center of a head of the passenger as seen in a side view, in a case in which the vehicle seat has been slid to a predetermined position at a vehicle rear side and the seatback has been set in a relaxed posture of being reclined to a recommended limit position, and wherein the enlarged inflating portion that has been inflated and expanded is disposed at a position that, as seen in a side view, does not overlap with an inflation/expansion region of the side airbag at a time at which the vehicle seat has been slid to the predetermined position at the vehicle rear side.

2. The vehicle passenger protecting device of claim 1, wherein the predetermined position is a rearmost position or a position up to 50 mm toward a vehicle front side from the rearmost position.

3. The vehicle passenger protecting device of claim 1, wherein, as seen in a side view, a lower end of the enlarged inflating portion that has been inflated and expanded is positioned further toward the vehicle lower side than a center of a head of a passenger corresponding to an AF05 human dummy.

4. The vehicle passenger protecting device of claim 1, wherein the enlarged inflating portion that has been inflated and expanded contacts a door trim that is further toward the vehicle lower side than the beltline of the door of the vehicle.

5. The vehicle passenger protecting device of claim 1, wherein the seatback is structured such that, at a time at which the vehicle is traveling, reclining to the relaxed posture is prohibited when the vehicle seat has not been slid to the predetermined position at the vehicle rear side.

6. The vehicle passenger protecting device of claim 1, wherein, at a time at which the vehicle is traveling, a warning is given when the seatback is reclined to the relaxed posture in a state in which the vehicle seat has not been slid to the predetermined position at the vehicle rear side.

7. The vehicle passenger protecting device of claim 1, wherein the seatback is configured to, at a time at which the vehicle is traveling, be stood up automatically when the vehicle seat is slid toward a vehicle front side in a state in which the seatback has been set in the relaxed posture.

8. A vehicle passenger protecting device of a vehicle, the vehicle passenger protecting device comprising:

a side airbag that is installed in a side portion at a vehicle transverse direction outer side of a seatback of a vehicle seat, and that inflates and expands toward a vehicle transverse direction outer side of a passenger seated on a seat cushion of the vehicle seat due to gas being supplied thereto at a time of a side collision of the vehicle; and a curtain airbag that is installed in at least a roof side rail of the vehicle, and that inflates and expands toward a vehicle lower side due to gas being supplied thereto at the time of a side collision of the vehicle, wherein the curtain airbag has an enlarged inflating portion that overlaps with a center of a head of the passenger as seen in a side view, in a case in which the vehicle seat has been slid to a predetermined position at a vehicle rear side and the seatback has been set in a relaxed posture of being reclined to a recommended limit position, and wherein the seatback is structured such that, at a time at which the vehicle is traveling, reclining to the relaxed posture is prohibited when the vehicle seat has not been slid to the predetermined position at the vehicle rear side.

9. A vehicle passenger protecting device of a vehicle, the vehicle passenger protecting device comprising:

a side airbag that is installed in a side portion at a vehicle transverse direction outer side of a seatback of a vehicle seat, and that inflates and expands toward a vehicle transverse direction outer side of a passenger seated on a seat cushion of the vehicle seat due to gas being supplied thereto at a time of a side collision of the vehicle; and a curtain airbag that is installed in at least a roof side rail of the vehicle, and that inflates and expands toward a vehicle lower side due to gas being supplied thereto at the time of a side collision of the vehicle, wherein the curtain airbag has an enlarged inflating portion that overlaps with a center of a head of the passenger as seen in a side view, in a case in which the vehicle seat has been slid to a predetermined position at a vehicle rear side and the seatback has been set in a relaxed posture of being reclined to a recommended limit position, and wherein, at a time at which the vehicle is traveling, a warning is given when the seatback is reclined to the relaxed posture in a state in which the vehicle seat has not been slid to the predetermined position at the vehicle rear side.

* * * * *